(12) United States Patent
Yamaoka (10) Patent No.: US 9,682,725 B2
(45) Date of Patent: Jun. 20, 2017

(54) LANE CHANGE ASSISTANCE APPARATUS

(71) Applicant: TOYOTA JIDOSHA KABUSHIKI KAISHA, Toyota-shi, Aichi (JP)

(72) Inventor: Masaaki Yamaoka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/095,243

(22) Filed: Apr. 11, 2016

(65) Prior Publication Data

US 2016/0311464 A1    Oct. 27, 2016

(30) Foreign Application Priority Data

Apr. 27, 2015 (JP) ................................. 2015-090212

(51) Int. Cl.
*B62D 15/02* (2006.01)
(52) U.S. Cl.
CPC ................................. *B62D 15/0255* (2013.01)
(58) Field of Classification Search
CPC .............. G01C 21/34; G06F 7/00; B60Q 1/00
See application file for complete search history.

(56) References Cited

U.S. PATENT DOCUMENTS

| | | | | |
|---|---|---|---|---|
| 8,989,914 | B1* | 3/2015 | Nemat-Nasser | G06F 7/00 340/988 |
| 2008/0021608 | A1* | 1/2008 | Schmitz | B60Q 9/008 701/36 |
| 2008/0204212 | A1* | 8/2008 | Jordan | B60Q 1/34 340/438 |
| 2009/0088966 | A1* | 4/2009 | Yokoyama | B62D 15/025 701/533 |
| 2013/0297172 | A1* | 11/2013 | Ariga | G08G 1/166 701/70 |
| 2014/0074356 | A1 | 3/2014 | Bone et al. | |
| 2016/0225261 | A1* | 8/2016 | Matsumoto | G08G 1/167 |

FOREIGN PATENT DOCUMENTS

WO     2007/123176 A1    11/2007
WO     2012/160591 A1    11/2012

* cited by examiner

*Primary Examiner* — Angela Ortiz
*Assistant Examiner* — Alex C Dunn
(74) *Attorney, Agent, or Firm* — Sughrue Mion, PLLC (57) ABSTRACT

The apparatus includes: a lane change assistance unit configured to perform the lane change assistance after elapse of a margin time set in advance from the time when a direction indicator at the adjacent lane side is switched to an ON-state by a driver of the vehicle; and a determination unit configured to determine whether or not an amount of steering to the adjacent lane side by the driver during the margin time is equal to or greater than a steering amount threshold value, or to determine whether or not the vehicle moves to the adjacent lane side due to a driver's steering during the margin time by a lateral distance set in advance.

2 Claims, 4 Drawing Sheets

LANE CHANGE ASSISTANCE APPARATUS

TECHNICAL FIELD

Apparatuses and methods consistent with exemplary embodiments relate to a lane change assistance apparatus configured to perform lane change assistance on a vehicle.

BACKGROUND

Lane change assistance is driving assistance for assisting a driver to change a lane in which a vehicle is travelling. As technical literature relating to lane change assistance, for example, International Publication No. WO 2012/160591 described below is known. In International Patent Publication No. WO 2012/160591, an apparatus is disclosed, in which, in a case where an intention of a driver to change lane is detected, lane change assistance such as a warning is performed according to the presence or absence of another vehicle in a lane of a lane change destination.

SUMMARY

Incidentally, as the lane change assistance, in addition to the assistance to give the driver a warning that there is another vehicle in the lane of the lane change destination, there is assistance to automatically control the vehicle and to cause the vehicle to change lane. In this lane change assistance, even in a case where the intention of the driver to change lane is detected, the lane change assistance is not started immediately after the detection, but the lane change assistance is started after a certain margin time (for example, 5 seconds) has elapsed. However, there is a case where some drivers want the lane change assistance to be started earlier without waiting for the elapse of the certain margin time.

Therefore, an aspect of an exemplary embodiment has an object of providing a lane change assistance apparatus that can start the lane change assistance by an operation of the driver without waiting for the elapse of the margin time.

According to an aspect of the exemplary embodiment, there is provided a lane change assistance apparatus that is configured to perform a lane change assistance for controlling a vehicle such that it changes lane to an adjacent lane from a travelling lane. The apparatus includes: a lane change assistance unit configured to perform the lane change assistance after elapse of a margin time set in advance from the time when a direction indicator at the adjacent lane side is switched to an ON-state by an operation of a driver of the vehicle; and a determination unit configured to determine whether or not an amount of steering to the adjacent lane side by the driver during the margin time is equal to or greater than a steering amount threshold value, or to determine whether or not the vehicle moves to the adjacent lane side due to a driver's steering during the margin time by a lateral distance set in advance. In a case where it is determined by the determination unit that the amount of steering during the margin time is equal to or greater than the steering amount threshold value, or in a case where it is determined by the determination unit that the vehicle has moved to the adjacent lane side during the margin time by the lateral distance, the lane change assistance unit is configured to start the lane change assistance before the elapse of the margin time.

According to the lane change assistance apparatus in an aspect of an exemplary embodiment, in a case where the direction indicator at the adjacent lane side is switched to an ON-state by the operation of the driver of the vehicle, when it is determined that the amount of steering is equal to or greater than the steering amount threshold value during the margin time or when it is determined that the vehicle has moved the lateral distance to the adjacent lane side during the margin time, the lane change assistance is started before the elapse of the margin time. Therefore, according to the lane change assistance apparatus, it is possible to start the lane change assistance by the operation of the driver without waiting for the elapse of the margin time.

In the lane change assistance apparatus, in a case where it is determined by the determination unit that the amount of steering during the margin time is equal to or greater than the steering amount threshold value, or in a case where it is determined by the determination unit that the vehicle has moved a lateral distance to the adjacent lane side during the margin time, the lane change assistance unit may perform the lane change assistance of which the movement time of the vehicle is shorter than that in a case where it is not determined by the determination unit that the amount of steering during the margin time is equal to or greater than the steering amount threshold value, and in a case where it is not determined by the determination unit that the vehicle has moved a lateral distance to the adjacent lane side during the margin time.

According to the lane change assistance apparatus, in a case where the lane change assistance is started by the operation of the driver without waiting for the elapse of the margin time, the lane change assistance is performed, of which the movement time of the vehicle is shorter than that in a case where the driver waits for the elapse of the margin time. Therefore, according to this lane change assistance apparatus, it is possible to perform the lane change assistance within a short time along the intention of the driver desiring earlier lane change.

According to the lane change assistance apparatus in an aspect of an exemplary embodiment, it is possible to start the lane change assistance by the operation of the driver without waiting for the elapse of the margin time.

DETAILED DESCRIPTION

Hereinafter, one or more exemplary embodiments will be described with reference to the accompanying drawings.

Figure 1:
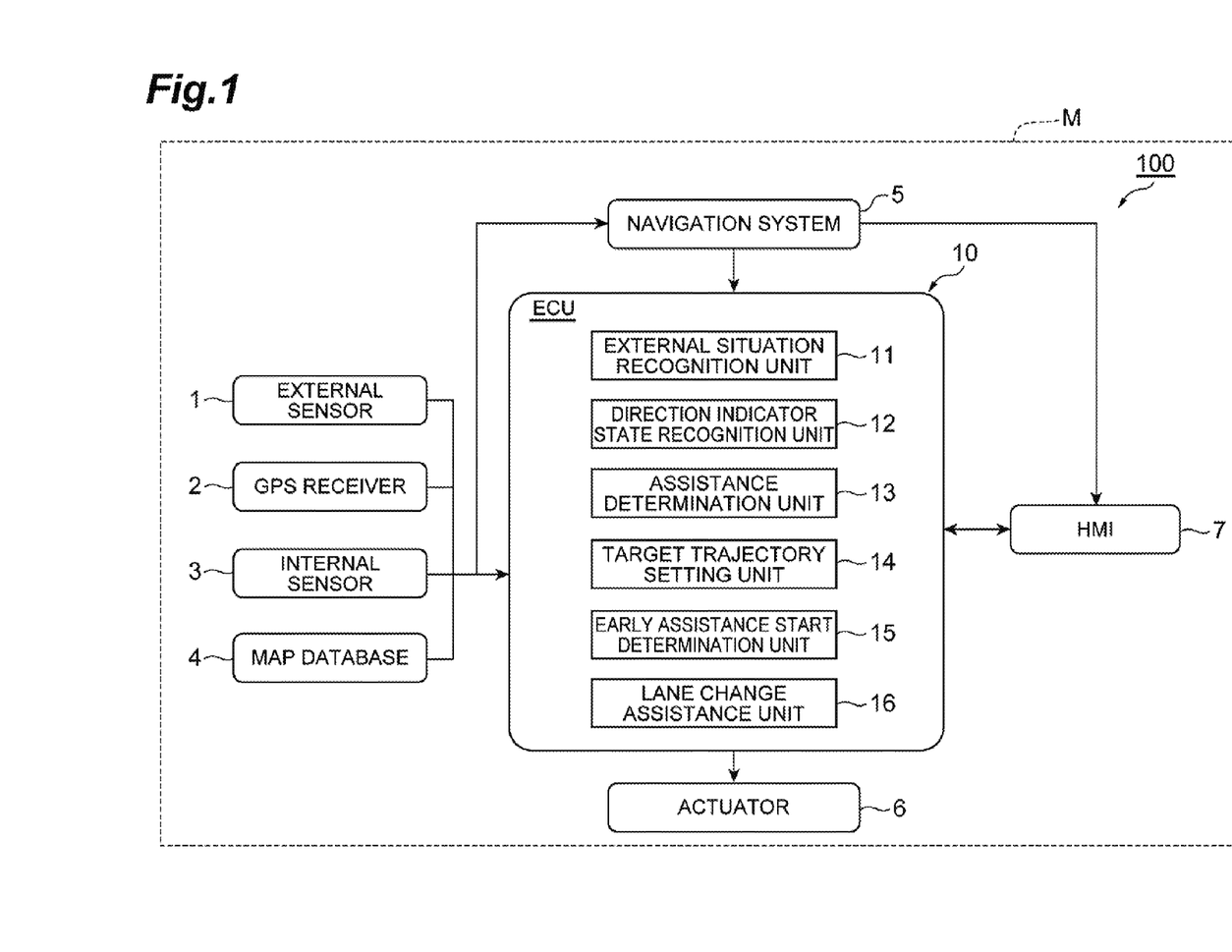
FIG. 1 is block diagram illustrating a lane change assistance apparatus in the present embodiment.

FIG. 1 is a block diagram illustrating a lane change assistance apparatus 100 in the present embodiment. The lane change assistance apparatus 100 illustrated in FIG. 1 is mounted on a vehicle M such as a passenger car and assists a lane change of the vehicle M by a driver.

In the lane change assistance apparatus 100 in the present embodiment, the lane change assistance for automatically controlling the vehicle M is executed such that the lane is changed from a travelling lane in which the vehicle M travels to an adjacent lane.

The lane change assistance apparatus 100 starts the lane change assistance by switching a direction indicator at the adjacent lane side from an OFF-state to an ON-state by an operation of the driver. Hereinafter, the operation by the driver to switch the direction indicator from an OFF-state to an ON-state will be referred to as a turn-ON operation of the direction indicator. In a case where the turn-ON operation of the direction indicator at the adjacent lane side is performed, the lane change assistance apparatus 100 starts the lane change assistance when a pre-set margin time has elapsed. The margin time is a time from performing of the turn-ON operation of the direction indicator at the adjacent lane side by the driver to starting of the lane change assistance which causes the vehicle M to change lane. The margin time may be a fixed value (for example, 5 seconds), or may be a value that varies according to the state of the vehicle M. The details of the lane change assistance in the present embodiment will be described below.

In addition, the lane change assistance apparatus 100 may perform a lane keeping assistance (lane trace control: LTC). The lane keeping assistance is a driving assistance for controlling the vehicle M such that a lateral position of the vehicle M becomes a target lateral position in the travelling lane, and for causing steering to be reflected in the travelling of the vehicle M in a case where there is a steering operation by the driver. The lateral position of the vehicle M is a position of the vehicle M in a width direction of the travelling lane. The lateral position of the vehicle M is, for example, recognized with a center position of the vehicle M in a plan view as a reference. The target lateral position is a position of the control target of the vehicle M in the lane keeping assistance. The target lateral position is set, for example, on a middle position in the travelling lane in the width direction. In addition, the target lateral position may be set on a position shifted from the middle position of the travelling lane in the width direction of the lane.

Figure 2:
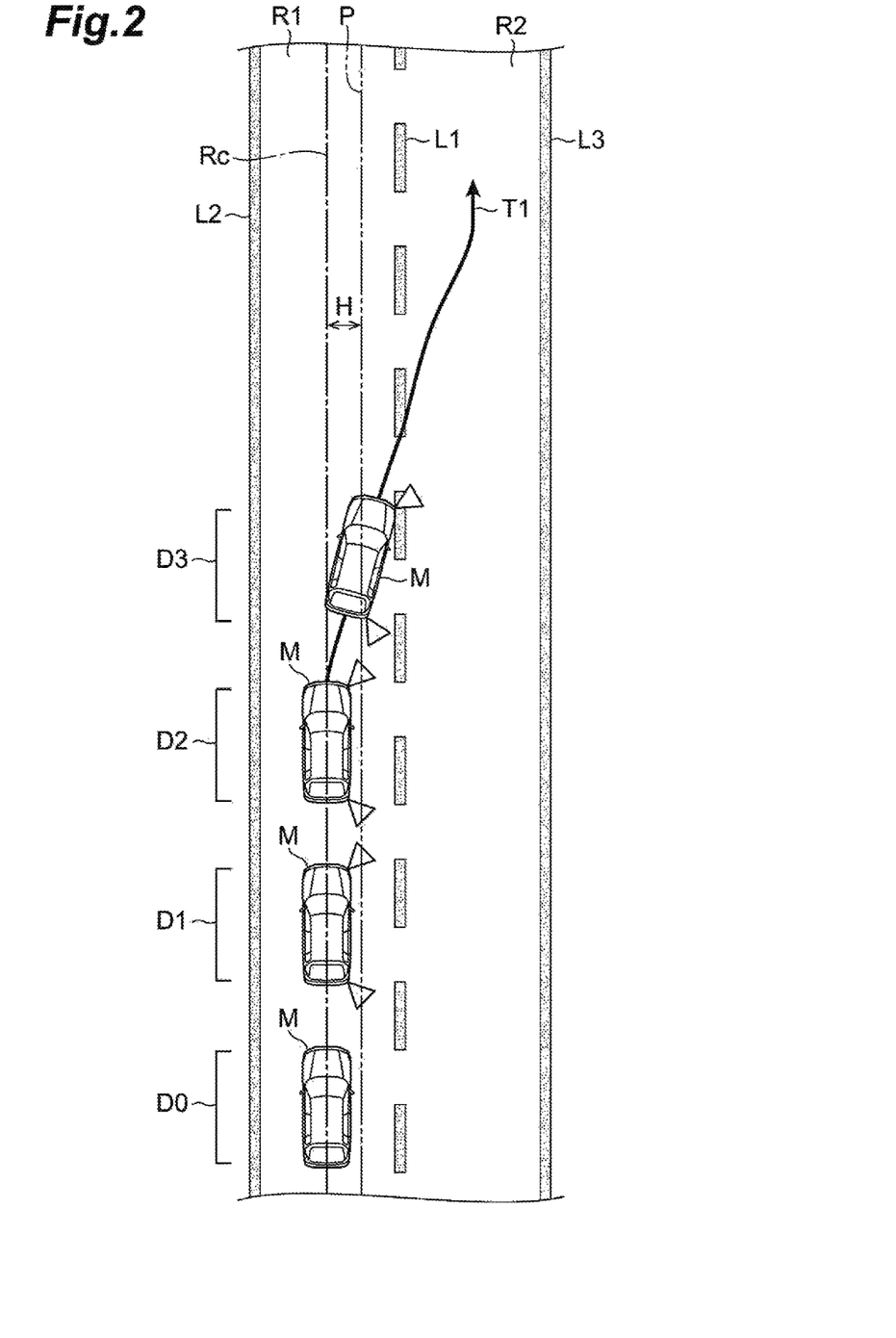
FIG. 2 is a plan view for describing lane change assistance in a case where a margin time has elapsed.

Hereinafter, the lane change assistance in the present embodiment will be described. FIG. 2 is a plan view for describing the lane change assistance in a case where the margin time has elapsed. The vehicle M on which the lane change assistance apparatus 100 is mounted, a travelling lane R1 in which the vehicle M travels, and an adjacent lane R2 adjacent to the travelling lane R1 are illustrated in FIG. 2. In addition, a lane line (lane boundary line) L1 which becomes a boundary between the travelling lane R1 and the adjacent lane R2, a lane line (roadway traffic zone boundary line) L2 which forms the travelling lane R1 together with the lane line L1, a lane line (middle line) L3 which forms the adjacent lane R2 together with the lane line L1, a middle position Rc of the travelling lane R1 in the width direction of the lane, and a target trajectory T1 along which the vehicle M travels in the lane change assistance are illustrated in FIG. 2.

In addition, in FIG. 2, D0, D1, D2, and D3 illustrate changes in situations before the vehicle M starts the lane change assistance and moves. D0 illustrates the situation in which the vehicle M is travelling on the middle position Rc while being kept on the travelling lane R1. D1 illustrates a situation in which the turn-ON operation of the direction indicator at the adjacent lane R2 side is performed by the driver. D2 illustrates a situation in which the margin time set in advance has elapsed and the lane change assistance is started. D3 illustrates a situation in which a lane change is executed along the target trajectory T1 by the lane change assistance. In D0, the lane keeping assistance may be performed on the vehicle M to keep the travelling lane R1.

In a case where the turn-ON operation of the direction indicator at the adjacent lane R2 side is performed by the driver as illustrated in D1, the lane change assistance apparatus 100 determines whether or not the lane change assistance is possible based on the information on obstacles (other vehicles or the like) detected by, for example, radar. The details of the determination of whether or not the lane change assistance is possible will be described below. In a case where it is determined that the lane change assistance is possible, the lane change assistance apparatus 100 sets the target trajectory T1 along which the vehicle M travels in the lane change assistance. The target trajectory is, for example, time series data of the steering control of the vehicle in the lane change assistance.

The target trajectory T1 is a trajectory along which the vehicle M travels in the lane change assistance performed after the margin time has elapsed. The target trajectory T1 illustrated in FIG. 2 is, for example, a trajectory from the position of the vehicle M in the situation illustrated in D2 to the middle position of the adjacent lane R2 (the middle position of the adjacent lane R2 in the width direction). An end point of the target trajectory T1 may be shifted to the right or left from the middle position of the adjacent lane R2. The end point of the target trajectory T1 may be on any point within the adjacent lane R2.

On the other hand, the lane change assistance apparatus 100 counts a time elapsed from performing of the turn-ON operation of the direction indicator at the adjacent lane R2 side by the driver, and then, determines whether or not the margin time set in advance has elapsed. In a case where the margin time has elapsed, the lane change assistance apparatus 100 performs the lane change assistance to control the travelling of the vehicle M along the target trajectory T1 as illustrated in D3.

In a case where the lane keeping assistance is performed to keep the travelling lane R1, the lane change assistance apparatus 100 may perform the steering control of the vehicle M such that the lateral position of the vehicle M during the margin time is maintained. In a case where the driver performs a driving operation (steering or acceleration operation or the like) during the margin time, the lane change assistance apparatus 100 reflects the driving operation of the driver in the travelling of the vehicle M. That is, the vehicle M moves during the margin time due to the steering of the driver.

In addition, in a case where an amount of steering toward the side opposite to the adjacent lane R2 by the driver is equal to or greater than a cancellation threshold value during the margin time, the lane change assistance apparatus 100 cancels the lane change assistance. The amount of steering is, for example, a steering angle or a steering torque of a steering wheel of the vehicle M due to the driver. The cancellation threshold value is a threshold value set in advance for determining the intention of the driver for the cancellation of the lane change assistance. In addition, in a case where the driver performs a braking operation (for example, an operation of pressing a brake pedal) during the margin time, the lane change assistance apparatus 100 may cancel the lane change assistance. In addition, even after the lane change assistance starts, the lane change assistance apparatus 100 can cancel the driver lane change assistance by the operation of the driver.

Figure 3:
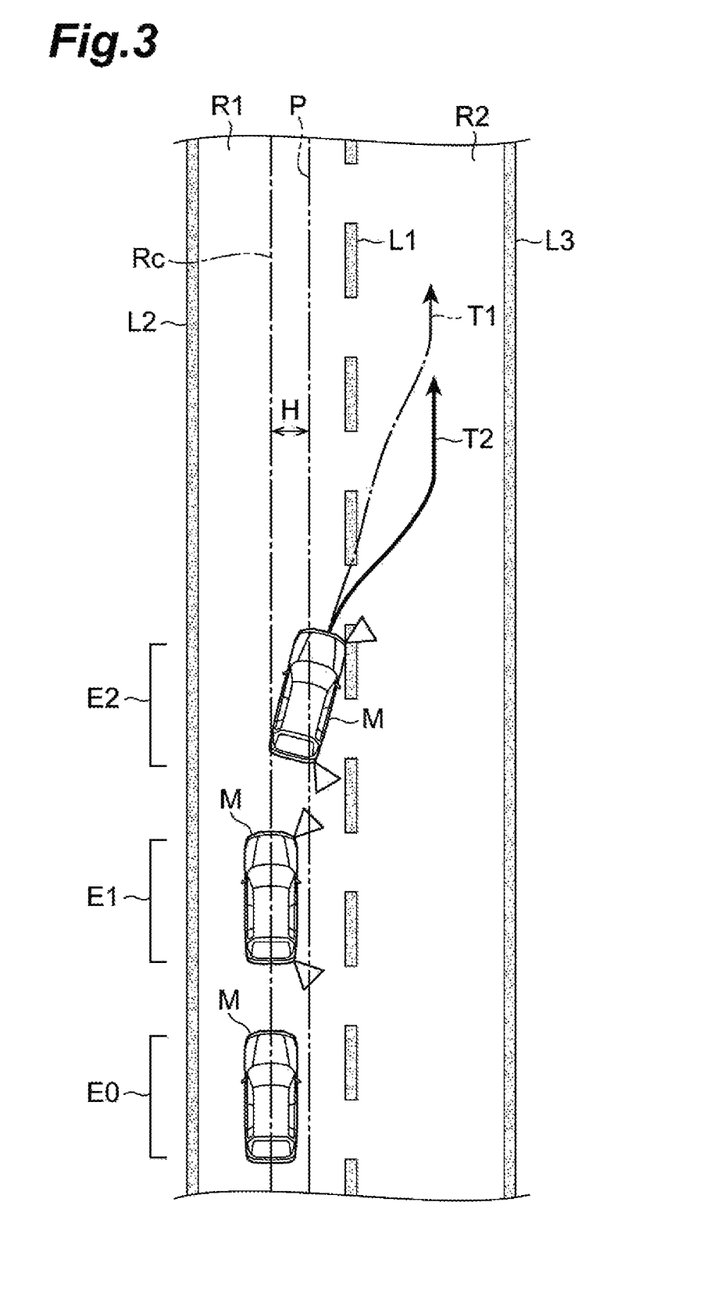
FIG. 3 is a plan view for describing lane change assistance in a case where a driver performs an early assistance starting operation.

Subsequently, the starting of the lane change assistance in a case where the driver performs an early assistance starting operation will be described with reference to FIG. 3. FIG. 3 is a plan view for describing the lane change assistance in a case where the driver performs an early assistance starting operation. The early assistance starting operation will be described below.

A target trajectory T2, a lateral distance H, and an early assistance starting lateral position P during the lane change assistance before the elapse of the margin time are illustrated in FIG. 3. The target trajectory T2 is a trajectory along which the vehicle M travels during the lane change assistance in a case where the driver performs the early assistance starting operation. The target trajectory T2 is a trajectory, for example, from the position in the situation illustrated in E2 to the middle position of the adjacent lane R2. The end point of the target trajectory T2 may be a position shifted to right or left from the middle position of the adjacent lane R2. The end point of the target trajectory T2 may be any position within the adjacent lane R2. The lateral distance H and the early assistance starting lateral position P will be described below.

E0, E1, and E2 in FIG. 3 illustrate changes in situations before the vehicle M starts the lane change assistance. E0 illustrates the situation in which the vehicle M is travelling on the middle position Rc while being kept on the travelling lane R1. E1 illustrates a situation in which the turn-ON operation of the direction indicator at the adjacent lane R2 side is performed by the driver. E2 illustrates a situation in which the lane change assistance is started before the elapse of the margin time by the early assistance starting operation by the driver.

The lane change assistance apparatus 100 starts the lane change assistance before the elapse of the margin time in a case where the driver performs the early assistance starting operation. That is, the driver can hasten the starting of the lane change assistance by the operation of the driver of the vehicle M without necessarily waiting for the elapse of the margin time. The early assistance starting operation is a predetermined operation by the driver having an intention of changing the lane earlier. Specifically, an operation by the driver to make the amount of steering to the adjacent lane R2 side be equal to or greater than the steering amount threshold value during the margin time and an operation to move the vehicle M by the lateral distance H set in advance to the adjacent lane R2 side during the margin time, are included as the early assistance starting operation.

The steering amount threshold value is a threshold value set in advance for determining that the driver performs the steering with an intention to change lane earlier. The steering amount threshold value may be a fixed value or may be a value that varies according to a shape of the travelling lane R1, a vehicle speed or the lateral position of the vehicle M, and the like. The lateral distance H is a distance set in advance for determining that the driver causes the vehicle M to move to the adjacent lane R2 side with an intention to change lane earlier. The lateral distance H may be a fixed value or may be a value that varies according to the vehicle speed, a lane width of the travelling lane R1, or the like.

In a case where the turn-ON operation of the direction indicator at the adjacent lane R2 side is performed by the driver as illustrated in E1, the lane change assistance apparatus 100 determines whether or not the lane change assistance is possible. In a case where it is determined that the lane change assistance is possible, the lane change assistance apparatus 100 sets the target trajectory T1 along which the vehicle M travels during the lane change assistance. On the other hand, the lane change assistance apparatus 100 counts the time elapsed from the time when the turn-ON operation of the direction indicator at the adjacent lane R2 side is performed by the driver. The lane change assistance apparatus 100 determines whether or not the margin tome has elapsed.

Here, in a case where the driver performs the early assistance starting operation before the margin time elapses, the lane change assistance apparatus 100 determines that the driver has an intention to change lane earlier and starts the lane change assistance before the margin time elapses. When the lateral position of the vehicle M reaches the early assistance starting lateral position P as illustrated in E2, the lane change assistance apparatus 100 determines that the vehicle has moved the lateral distance H set in advance to the adjacent lane R2 side during the margin time and starts the lane change assistance early.

The early assistance starting lateral position P is a position determined with the lateral position of the vehicle M when the driver performs the turn-ON operation of the direction indicator at the adjacent lane R2 side as a reference, rather than a position necessarily determined with the middle position Rc as a reference. In FIG. 3, the lateral position of the vehicle M when the driver performs the turn-ON operation of the direction indicator at the adjacent lane R2 side is the middle position Rc. Therefore, the early assistance starting lateral position P is illustrated as a position separated from the middle position Rc to the adjacent lane R2 side by the lateral distance H.

In addition, the lane change assistance apparatus 100 may make a movement time of the vehicle M during the lane change assistance in a case where the driver performs the early assistance starting operation without waiting for the elapse of the margin time be shorter compared to that during the lane change assistance in a case where the driver waits for the elapse of the margin time during the lane change assistance. The movement time is a time taken from the starting of the lane change assistance to the completion of the lane change of the vehicle M by the lane change assistance.

Specifically, the lane change assistance apparatus 100 may make the length of the target trajectory T2 during the lane change assistance in a case where the driver performs the early assistance starting operation be shorter compared to the length of the target trajectory T1 during the lane change assistance in a case were the driver waits for the elapse of the margin time. The target trajectory T1 illustrated in FIG. 3 is a target trajectory during the lane change assistance in a case where the margin time has elapsed at the position of the vehicle M illustrated in E2. As illustrated in FIG. 3, even in a case where the lane change assistance is started at the same position, the lane change assistance apparatus 100 can set the target trajectory T2 of which the length is shorter than that of the target trajectory T1. Therefore, it is possible to make the movement time of the vehicle M during the lane change assistance be short. The target trajectory T2 is not necessarily shorter than the target trajectory T1, and may be the same length as that of the target trajectory T1.

In addition, the lane change assistance apparatus 100 may make the movement time of the vehicle M during the lane change assistance be short by changing a target vehicle speed pattern (time series data of the control target value in the vehicle speed control) of the vehicle M during the lane change assistance. The lane change assistance apparatus 100, for example, makes an allowable maximum vehicle speed of the vehicle M during the lane change assistance in a case where the driver performs the early assistance starting operation be higher compared to the allowable maximum vehicle speed during the lane change assistance in a case were the driver waits for the elapse of the margin time. The allowable maximum vehicle speed is the maximum vehicle speed of the vehicle M allowed to set by the lane change assistance apparatus 100 in the vehicle speed control of the vehicle M during the lane change assistance. The lane change assistance apparatus 100 may make the movement time of the vehicle M be short during the lane change assistance by changing the allowable maximum vehicle speed to the highest target vehicle speed pattern.

An allowable maximum acceleration or an allowable maximum deceleration may be used instead of the allowable maximum vehicle speed. The allowable maximum acceleration is a maximum acceleration of the vehicle M which is allowed to be set by the lane change assistance apparatus 100 in the vehicle speed control of the vehicle M during the lane change assistance. The allowable maximum deceleration is a maximum deceleration of the vehicle M which is allowed to be set by the lane change assistance apparatus 100 in the vehicle speed control of the vehicle M during the lane change assistance. As above, the lane change assistance apparatus 100 makes the movement time during the lane change assistance in a case where the driver performs the early assistance starting operation be short compared to that during the lane change assistance in a case where the driver waits for the elapse of the margin time.

Configuration of the Lane Change Assistance Apparatus

Hereinafter, the configuration of the lane change assistance apparatus 100 in the present embodiment will be described with reference to FIG. 1. As illustrated in FIG. 1, the lane change assistance apparatus 100 is mounted on a vehicle M such as an automobile. The lane change assistance apparatus 100 includes an external sensor 1, a global positioning system (GPS) receiver 2, an internal sensor 3, a map database 4, a navigation system 5, an actuator 6, an electronic control unit (ECU) 10, and a human machine interface (HMI) 7.

The external sensor 1 is a detection device configured to detect an external situation which is surroundings information of the vehicle M. The external sensor 1 at least includes a camera. The camera is, for example, provided on the rear side of a windshield of the vehicle M. The camera transmits the image information relating to the external situation of the vehicle M to the ECU 10. The camera may be a monocular camera or may be a stereo camera. The stereo camera has two imaging units that are arranged so as to reproduce a binocular parallax.

The external sensor 1 may include radar or a laser imaging direction and ranging (LIDAR). The radar detects an obstacle outside of the vehicle M using a radio wave (for example, a millimeter wave). The radar detects the obstacle by transmitting the radio wave to the surroundings of the vehicle M and receiving the wave reflected from the obstacle. The radar transmits the detected obstacle information to the ECU 10.

The LIDAR detects the obstacle outside the vehicle M using light. The LIDAR transmits the light to the surroundings of the vehicle M, measures the distance to the reflection point by receiving the light reflected from the obstacle, and then, detects the obstacle. The LIDAR transmits the detected obstacle information to the ECU 10.

The GPS receiver 2 receives signals from three or more GPS satellites and measures the position of the vehicle M (for example, the latitude and longitude of the vehicle M). The GPS receiver 2 transmits the measured position information of the vehicle M to the ECU 10. Instead of the GPS receiver 2, another means for specifying the latitude and the longitude of the vehicle M may be used.

The internal sensor 3 is a detection device configured to detect the travelling state of the vehicle M and the driving operations of the driver. The internal sensor 3 includes at least one of a vehicle speed sensor, an acceleration sensor, and a yaw rate sensor. The vehicle speed sensor is a detection device configured to detect the speed of the vehicle M. As the vehicle speed sensor, for example, a wheel speed sensor is used, which is provided on vehicle wheels of the vehicle M or a drive shaft and the like rotating integrally with vehicle wheels and detects a rotational speed of the vehicle wheels. The vehicle speed sensor transmits the detected vehicle speed information to the ECU 10.

The acceleration sensor is a detection device configured to detect an acceleration of the vehicle M. The acceleration sensor includes, for example, a longitudinal acceleration sensor that detects acceleration in the longitudinal direction of the vehicle M and a lateral acceleration sensor that detects a lateral acceleration of the vehicle M. The acceleration sensor transmits, for example, the acceleration information of the vehicle M to the ECU 10. The yaw rate sensor is a detection device of the vehicle M configured to detect a yaw rate around the vertical axis of the center of gravity of the vehicle M (rotational angular velocity). As the yaw rate sensor, for example, a gyro sensor can be used. The yaw rate sensor transmits the detected yaw rate information of the vehicle M to the ECU 10.

In addition, the internal sensor 3 includes a steering sensor and a direction indicator sensor. The steering sensor is provided, for example, on the steering shaft of the vehicle M and detects at least one of the steering torque given to the steering by the driver and a steering angle of the steering wheel. The steering sensor transmits the detected steering information relating to the steering by the driver to the ECU 10. The steering sensor does not necessarily need to be included in a case where the lane change assistance apparatus 100 does not use the amount of steering in determining the operation start lateral position WO.

The direction indicator sensor is provided, for example, on a direction indicator lever of the vehicle M, and detects the operation of the direction indicator lever by the driver. Direction indicator sensors detect whether the operation of a direction indicator lever by the driver is the operation of the direction indicator lever for the right direction or the operation of the direction indicator lever for the left direction. The direction indicator sensor transmits the detected direction indicator information to the ECU 10.

The map database 4 is a database in which map information is included. The map database is formed, for example, in a hard disk drive (HDD) mounted on the vehicle. In the map information, for example, position information of roads, information on road types (for example, type of a curve, a straight portion, and a curvature of the curve), and position information of intersections, and branch points are included. Information of a road section where lane change is prohibited by traffic regulations may be included in the map information. Furthermore, in order to use the position information of a shielding structure such as a building or a wall and the simultaneous localization and mapping (SLAM) technology, it is preferable that the map information includes an output signal of the external sensor 1.

The map database 4 does not necessarily need to be mounted on the vehicle M, and may be stored in a computer in a facility such as an information processing center which is capable of communicating with the vehicle M.

The navigation system 5 is a device configured to perform guidance to a destination set by a driver of the vehicle M for a driver of the vehicle M. The navigation system 5 calculates a travelling route of the vehicle M based on the position information of the host vehicle M measured by the GPS receiver 2 and the map information in the map database 4. The route may be a route in which a preferable lane is specified on a multi-lane road section. The navigation system 5 calculates, for example, a target route from the position of the vehicle M to the destination and performs notification to the driver of the target route by display on a display or a voice output of a speaker. In the target route, information on the road section where the vehicle M is subject to change the lane may be included. The navigation system 5, for example, transmits the target route information of the vehicle M to the ECU 10. The navigation system 5 does not necessarily need to be included.

The actuator 6 is a device configured to perform a travel control of the vehicle M. The actuator 6 includes at least a throttle actuator, a brake actuator, and a steering actuator. The throttle actuator controls a supply amount (throttle opening degree) of air to an engine according to a control signal from the ECU 10, and controls the driving power of the vehicle M. In a case where the vehicle M is a hybrid vehicle or an electric vehicle, the driving power is controlled by the control signal from the ECU 10 being input to a motor which is a source of the driving power.

The brake actuator controls a brake system according to a control signal from the ECU 10 and controls the braking force given to the wheels of the vehicle M. For example, a hydraulic brake system can be used as the brake system. The steering actuator controls the driving of an assist motor that controls the steering torque in the electric power steering system according to a control signal from the ECU 10. In this way, the steering actuator controls the steering torque of the vehicle M.

The HMI 7 is an interface configured to perform input and output of information between the driver and the lane change assistance apparatus 100. The HMI 7 includes, for example, a display panel for displaying the image information for the driver, a speaker for audio output, and an operation button or a touch panel for the driver to perform an input operation. The HMI 7 transmits the information input by the driver (for example, ON and OFF of the lane change assistance) to the ECU 10. In addition, the HMI 7 performs display or voice output of the image information from the speaker according to a control signal from the ECU 10. The lane change assistance apparatus 100 does not necessarily need to include the HMI 7.

Next, a functional configuration of the ECU 10 will be described. The ECU 10 is an electronic control unit including a central processing unit (CPU), a read only memory (ROM), a random access memory (RAM), and the like. In the ECU 10, various controls are performed by loading a program stored in the ROM into the RAM and the program being executed by the CPU. The ECU 10 may be configured with a plurality of electronic control units. A part of the functions of ECU 10 may be executed by a computer in a facility such as an information processing center which is capable of communicating with the vehicle M, or may be executed by a mobile information terminal of a person.

The ECU 10 includes an external situation recognition unit 11, a direction indicator state recognition unit 12, an assistance determination unit 13, a target trajectory setting unit 14, an early assistance start determination unit 15, and a lane change assistance unit 16.

The external situation recognition unit 11 recognizes external situations of the vehicle M based on the detection results (for example, image information from the camera, obstacle information from the radar, and obstacle information from the LIDAR) of the external sensor 1. In the external situation, for example, the positions and types (types of line such as a dashed line or a continuous line) of the lane lines L1 and L2 of the travelling lane R1 in which the vehicle M travels, the positions and types of the lane lines L1 and L3 of the adjacent lane R2, and the middle position Rc in the width direction of the travelling line R1 are included. In the external situation, obstacle (moving obstacles such as other vehicles or pedestrians, fixed obstacles such as buildings) information on the surroundings of the vehicle M is also included. The external situation recognition unit 11 may recognize the external situation by a vehicle-to-vehicle communication or a road-to-vehicle communication via a communication unit.

The direction indicator state recognition unit 12 recognizes a situation of a direction indicator of the vehicle M based on direction indicator information from the direction indicator sensor in the internal sensor 3. The direction indicator state recognition unit 12 determines (recognizes) switching by the driver between the ON-state and OFF-state of the right and left direction indicators.

In a case where it is recognized by the direction indicator state recognition unit 12 that a direction indicator is switched to an ON-state, the assistance determination unit 13 determines whether or not the lane change assistance can be performed, which causes the vehicle M to change lane by controlling the vehicle M. In a case where any of the right or left direction indicator is determined to have been switched from the OFF-state to the ON-state, the assistance determination unit 13 determines whether or not the adjacent lane R2 is present at the side of the direction indicator which has been switched to the ON-state. The assistance determination unit 13 determines whether or not the adjacent lane R2 is present using a known image analysis method based on, for example, the image information from the camera in the external sensor 1. The assistance determination unit 13 may determine whether or not the adjacent lane R2 is present based on the position information of the vehicle M from the GPS receiver 2 and the map information from the map database 4. In a case where it is determined that the adjacent lane R2 is not present, the assistance determination unit 13 determines that the lane change assistance cannot be performed.

In addition, the assistance determination unit 13 determines whether or not a space where the vehicle M can change lane is present in the adjacent lane R2 based on, for example, the obstacle information from the radar or the LIDAR in the external sensor 1. In a case where it is determined that a space where the vehicle M can change lane is not present in the adjacent lane R2 due to other vehicles travelling in the adjacent lane R2 or the like, the assistance determination unit 13 determines that the lane change assistance cannot be performed. In addition, the assistance determination unit 13 may determine whether or not the lane change assistance which causes the vehicle M to change lane can be performed using a known method based on a relative relationship (relative position, relative speed, or the like) between another vehicle travelling on the adjacent lane R2 and the vehicle M.

Furthermore, in a case where the assistance determination unit 13 recognizes that the vehicle M is in a road section where lane change is prohibited (for example, in the vicinity of a branching route or an intersection, a road section where lane change is prohibited by traffic regulations, or the like) based on, for example, the position information of the vehicle M from the GPS receiver 2 and the map information from the map database 4, the assistance determination unit 13 may determine that the lane change assistance cannot be performed. Furthermore, in a case where the vehicle speed of the vehicle M is lower than a vehicle speed threshold value based on the vehicle speed information from the vehicle speed sensor in the internal sensor 3, the assistance determination unit 13 may determine that the lane change assistance cannot be performed. The vehicle speed threshold value is, for example, 60 km/h. The ECU 10 does not necessarily need to include the assistance determination unit 13.

For example, in a case where it is determined by the assistance determination unit 13 that the lane change assistance can be performed, the target trajectory setting unit 14 sets the target trajectory in the lane change assistance. The target trajectory setting unit 14 sets the target trajectory from the current position of the vehicle M to the center position of the adjacent lane R2 using a known method based on, for example, the detection results of the external sensor 1 and the internal sensor 3. The target trajectory setting unit 14 may use the position information of the vehicle M from the GPS receiver 2 and the map information from the map database 4. Firstly, the target trajectory setting unit 14 sets the target trajectory T1 in the lane change assistance in a case where the driver waits for the elapse of the margin time.

In addition, the target trajectory setting unit 14 may set the target vehicle speed pattern of the vehicle M (time series data of the control target value in the vehicle speed control) according to the target trajectory. The target trajectory setting unit 14 sets the target vehicle speed pattern from the current vehicle speed of the vehicle M within the range which does not give an uncomfortable feeling to the driver. The target trajectory setting unit 14 sets the target vehicle speed pattern such that, for example, the vehicle speed at the end point of the target trajectory becomes the vehicle speed set in advance.

In a case where it is determined by the early assistance start determination unit 15 described below that the early assistance starting operation is performed by the driver, instead of the target trajectory T1, the target trajectory setting unit 14 may set a new target trajectory T2 of which the length is shorter than that of the target trajectory T1. The length of the target trajectory, for example, is a total length of the trajectory from the current position of the vehicle M to the end point of the target trajectory. As the length of the target trajectory, a length of the travelling lane R1 in the extending direction may be used.

In addition, in a case where it is determined by the early assistance start determination unit 15 described below that the early assistance starting operation is performed by the driver, the target trajectory setting unit 14 may set the target vehicle speed pattern in which the movement time of the vehicle M is short in the lane change assistance compared to the case where the driver waits for the elapse of the margin time.

In a case where it is recognized by the direction indicator state recognition unit 12 that, for example, the direction indicator is switched to the ON-state, the early assistance start determination unit 15 counts the time elapsed from this recognition. The early assistance start determination unit 15 determines whether or not the margin time set in advance has elapsed from the recognition time at which the direction indicator has been switched to the ON-state. In a case where it is determined by the assistance determination unit 13 that the lane change assistance cannot be performed, the early assistance start determination unit 15 cancels the counting of the margin time.

In addition, the early assistance start determination unit 15 determines whether or not the early assistance starting operation is performed by the driver during the margin time. The early assistance start determination unit 15 determines whether or not the amount of steering by the driver to the adjacent lane R2 side during the margin time is equal to or greater than the steering amount threshold value based on, for example, the steering information from the steering sensor in the internal sensor 3.

Alternatively, by recognizing the positional relationship between the lane lines L1 and L2 in the travelling lane R1 and the vehicle M based on the image information from the camera in the external sensor 1, the early assistance start determination unit 15 determines whether or not the vehicle M moves to the adjacent lane R2 side by the lateral distance H set in advance due to the steering by the driver during the margin time. The early assistance start determination unit 15 does not need to necessarily perform both the determination relating to the amount of steering and the determination relating to the movement of the vehicle M described above, and may perform only either one of the determinations.

In a case where it is determined that an early assistance starting operation is performed by the driver during the margin time, the early assistance start determination unit 15 sets a shortened margin time which is shorter than the margin time set previously. The shortened margin time is shorter (for example, 3 seconds) than the margin time set previously. For example, a time based on traffic-related laws or regulations is set as the shortened margin time. The early assistance start determination unit 15 determines whether or not the shortened margin time has elapsed from the recognition time at which the direction indicator has been switched to the ON-state. The shortened margin time does not necessarily need to be set.

In a case where it is determined by the early assistance start determination unit 15 that the margin time has elapsed, the lane change assistance unit 16 performs the lane change assistance to cause the vehicle M to change lane from the travelling lane R1 to the adjacent lane R2. In this case, the lane change assistance unit 16 performs the lane change assistance by transmitting a control signal to the actuator 6 such that, for example, the vehicle M is caused to travel along the target trajectory T1 illustrated in FIG. 2.

Figure 4:
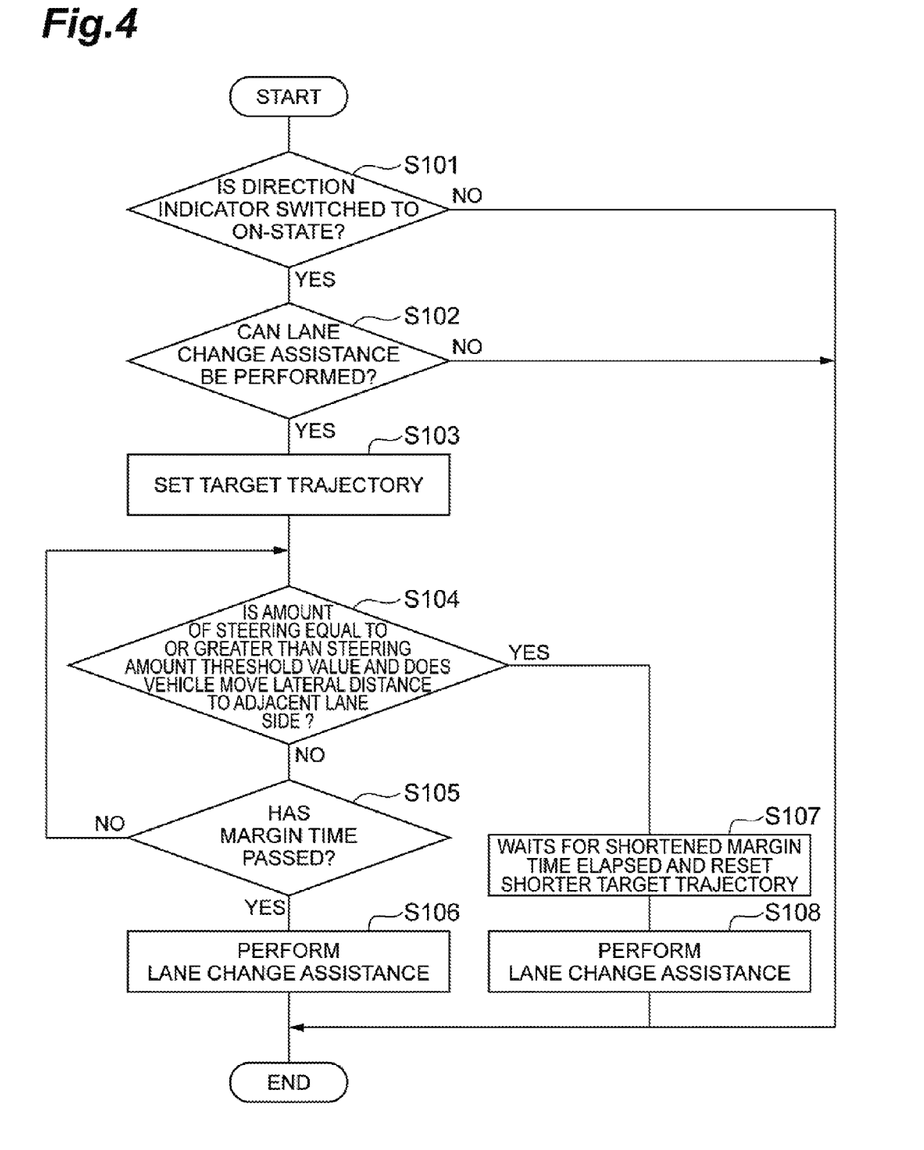
FIG. 4 is a flowchart illustrating a lane change assistance method in the lane change assistance apparatus in the present embodiment.

In addition, in a case where it is determined by the early assistance start determination unit 15 that the amount of steering by the driver to the adjacent lane R2 side during the margin time is equal to or greater than the steering amount threshold value, or in a case where it is determined that the vehicle M has moved the lateral distance H to the adjacent lane R2 side during the margin time, the lane change assistance unit 16 performs the lane change assistance. The lane change assistance unit 16 performs the lane change assistance even before the elapse of the margin time. The lane change assistance unit 16 performs the lane change assistance by transmitting a control signal to the actuator 6 such that, for example, the vehicle M is caused to travel along the target trajectory T2 illustrated in FIG. 3. Even in this case, in a case where the shortened margin time has elapsed from the recognition time at which the direction indicator has been switched to the ON-state, the lane change assistance unit 16 is temporarily brought into a waiting state without performing the lane change assistance. Lane change assistance method in the lane change assistance apparatus Next, a lane change assistance method in the lane change assistance apparatus 100 in the present embodiment will be described. FIG. 4 is a flowchart illustrating a lane change assistance method in the lane change assistance apparatus 100 in the present embodiment. The flowchart illustrated in FIG. 4 is repeatedly executed at each of times set in advance (for example, at each of times according to the internal frequency of the ECU 10), for example, during the time when the vehicle M is travelling.

As illustrated in FIG. 4, in STEP S101, the direction indicator state recognition unit 12 in the ECU 10 in the lane change assistance apparatus 100 recognizes whether or not the direction indicator of the vehicle M has been switched from the OFF-state to the ON-state. The direction indicator state recognition unit 12 recognizes whether or not the direction indicator of the vehicle M has been switched from the OFF-state to the ON-state based on the direction indicator information from the direction indicator sensor.

In a case where it is not recognized that the direction indicator has been switched from the OFF-state to the ON-state (NO in S101), the ECU 10 ends the current processing and executes STEP S101 again after the elapse of a time set in advance. In the ECU 10, in a case where it is recognized that the direction indicator has been switched from the OFF-state to the ON-state (YES in S101), the process proceeds to STEP S102. In a case where it is recognized that the direction indicator has been switched from the OFF-state to the ON-state, the early assistance start determination unit 15 starts to count the margin time.

In STEP S102, the assistance determination unit 13 in the ECU 10 determines whether or not the lane change assistance can be performed. The assistance determination unit 13 determines whether or not the adjacent lane R2 is present at the side of the direction indicator which has been switched to the ON-state using a known image analysis method based on, for example, the image information from the camera in the external sensor 1. In a case where it is determined that the adjacent lane R2 is not present, the assistance determination unit 13 determines that the lane change assistance cannot be performed. In addition, the assistance determination unit 13 determines whether or not the lane change assistance can be performed by recognizing the obstacles surrounding the vehicle M based on the obstacle information from the radar or the LIDAR in the external sensor 1.

In a case where it is determined that the lane change assistance cannot be performed (NO in S102), the ECU 10 ends the current processing and executes STEP S101 again after the elapse of a time set in advance. In the ECU 10, in a case where it is determined that the lane change assistance can be performed (YES in S102), the process proceeds to STEP S103.

In STEP S103, the target trajectory setting unit 14 in the ECU 10 performs the setting of the target trajectory. The target trajectory setting unit 14 sets the target trajectory from the current position of the vehicle M to the center position of the adjacent lane R2 using a known method based on the detection results of the external sensor 1 and the internal sensor 3. Here, the target trajectory setting unit 14 sets, for example, the target trajectory T1 in the lane change assistance in a case where the driver waits for the elapse of the margin time. The target trajectory setting unit 14 may set the target vehicle speed pattern for controlling the vehicle speed of the vehicle M travelling along the target trajectory T1. The target trajectory setting unit 14 does not necessarily need to firstly set the target trajectory T1, and may set the target trajectory T1 after the elapse of the margin time.

In STEP S104, the early assistance start determination unit 15 in the ECU 10 determines whether or not the amount of steering by the driver to the adjacent lane R2 side during the margin time is equal to or greater than the steering amount threshold value and whether or not the vehicle M moves the lateral distance H to the adjacent lane R2 side during the margin time due to the steering by the driver. The early assistance start determination unit 15 determines whether or not the amount of steering by the driver to the adjacent lane R2 side during the margin time is equal to or greater than the steering amount threshold value based on, for example, the steering information from the steering sensor in the internal sensor 3. The early assistance start determination unit 15 determines whether or not the vehicle M moves the lateral distance H set in advance during the margin time due to the steering by the driver based on, for example, the image information from the camera in the external sensor 1 and the steering information from the steering sensor in the internal sensor 3.

In the ECU 10, in a case where it is determined that the amount of steering by the driver to the adjacent lane R2 side during the margin time is equal to or greater than the steering amount threshold value or in a case where it is determined that the vehicle M has moved the lateral distance H to the adjacent lane R2 side during the margin time (YES in S104), the process proceeds to STEP S107. In the ECU 10, in a case where it is not determined that the amount of steering by the driver to the adjacent lane R2 side during the margin time is equal to or greater than the steering amount threshold value and in a case where it is not determined that the vehicle M has moved the lateral distance H to the adjacent lane R2 side during the margin time (NO in S104), the process proceeds to STEP S105.

In STEP S105, the early assistance start determination unit 15 in the ECU 10 determines whether or not the margin time has elapsed. In a case where it is determined that the margin time has not elapsed, the ECU 10 performs the determination in STEP S104 again. In the ECU 10, in a case where it is determined that the margin time has elapsed, the process proceeds to STEP S106.

In STEP S106, the lane change assistance unit 16 in the ECU 10 performs the lane change assistance. The lane change assistance unit 16 performs the lane change assistance along the target trajectory T1 as the lane change assistance in a case where the driver waits for the elapse of the margin time. The lane change assistance unit 16 transmits a control signal to the actuator 6 such that the vehicle M travels along the target trajectory T1. The ECU 10 ends the current processing after the lane change assistance is performed, and executes STEP S101 again after the elapse of a time set in advance.

In STEP S107, the early assistance start determination unit 15 in the ECU 10 performs the setting of the shortened margin time. In a case where the shortened margin time has not elapsed from the recognition time at which the direction indicator has been switched to the ON-state, the ECU 10 temporally waits until the shortened margin time elapses without proceeding to S108. In addition, in STEP S107, the ECU 10 sets a target trajectory T2 of which the length is shorter than the target trajectory T1 during the lane change assistance in a case where the driver waits for the elapse of the margin time. The ECU 10 may set the target vehicle speed pattern in which the movement time of the vehicle M is shorter than in the target vehicle speed pattern during the lane change assistance in a case were the driver waits for the elapse of the margin time. Then, in the ECU 10, the process proceeds to S108.

In STEP S108, the lane change assistance unit 16 in the ECU 10 performs the lane change assistance. The lane change assistance unit 16 performs the lane change assistance along the target trajectory T2 as the lane change assistance, for example, in a case where the driver performs the early assistance starting operation during the margin time. The lane change assistance unit 16 transmits a control signal to the actuator 6 such that the vehicle M travels along the target trajectory T2. The ECU 10 ends the current processing after the lane change assistance is performed, and executes STEP S101 again after the elapse of a time set in advance.

Operational Effects of the Lane Change Assistance Apparatus

According to the lane change assistance apparatus 100 in the present embodiment described above, in a case where the direction indicator at the adjacent lane R2 side is switched to the ON-state by the operation of the driver of the vehicle M, when it is determined that the amount of steering is equal to or greater than the steering amount threshold value during the margin time or when it is determined that the vehicle M has moved the lateral distance H to the adjacent lane R2 side during the margin time, the lane change assistance is started before the elapse of the margin time. Therefore, according to the lane change assistance apparatus 100, in contrast to the apparatus in the related art, it is possible to start the lane change assistance by the operation of the driver without waiting for the elapse of the margin time.

In addition, in the lane change assistance apparatus 100, in a case where the early assistance starting operation is performed by the driver during the margin time, the lane change assistance may be performed, of which the movement time of the vehicle M is shorter than that in a case where the early assistance starting operation is not performed by the driver during the margin time. In this case, it is considered that the driver who performs the early assistance starting operation desires earlier lane change. Therefore, it is possible to perform the lane change assistance within a short time along the intention of the driver.

As above, the embodiment of the present invention has been described. However, the present invention is not limited to the description above. Including the above-described embodiment, the present invention can be embodied in aspects of various modifications and improvements based on the knowledge of those skilled in the art. For example, in a case where the driver performs a weak braking operation (for example, an operation of the brake pedal of which the braking amount is equal to or less than a predetermined threshold value) during the margin time, because there is a possibility that the driver may be aware of a risk which cannot be recognized by the apparatus, the lane change assistance apparatus 100 may extend the margin time. The extension of the margin time can be executed by, for example, a downshifting or reducing the set vehicle speed. Alternatively, in this case, the lane change assistance apparatus 100 may extend the length of the target trajectory such that the movement time during the lane change assistance becomes long.

Additionally, the lane change assistance apparatus 100 may include a dedicated early assistance start button (or an early assistance start button that can be shared by various driving assistances). In a case where the driver presses the early assistance start button, the lane change assistance apparatus 100 may consider that the amount of steering to the adjacent lane R2 side by the driver is equal to or greater than the steering amount threshold value, and then, may start the lane change assistance before the elapse of the margin time.

What is claimed is:

1. A lane change assistance apparatus that is configured to perform a lane change assistance for controlling a vehicle such that it changes lane toward an adjacent lane from a travelling lane, the apparatus comprising:
a lane change assistance unit configured to perform the lane change assistance after elapse of a margin time set in advance, from the time when a direction indicator at the adjacent lane side is switched to an ON-state by an operation of a driver of the vehicle; and
a determination unit configured to determine whether or not an amount of steering to the adjacent lane side by the driver during the margin time is equal to or greater than a steering amount threshold value, or to determine whether or not the vehicle moves to the adjacent lane side due to a driver's steering during the margin time by a lateral distance set in advance,
wherein, in a case where it is determined by the determination unit that the amount of steering during the margin time is equal to or greater than the steering amount threshold value, or in a case where it is determined by the determination unit that the vehicle has moved to the adjacent lane side during the margin time by the lateral distance, the lane change assistance unit is configured to start the lane change assistance before the elapse of the margin time.

2. The lane change assistance apparatus according to claim 1,
wherein, in a case where it is determined by the determination unit that the amount of steering during the margin time is equal to or greater than the steering amount threshold value, or in a case where it is determined by the determination unit that the vehicle has moved to the adjacent lane side during the margin time by the lateral distance, the lane change assistance unit is configured to perform the lane change assistance of which the movement time of the vehicle is shorter than that in a case where it is not determined by the determination unit that the amount of steering during the margin time is equal to or greater than the steering amount threshold value, and in a case where it is not determined by the determination unit that the vehicle has moved to the adjacent lane side during the margin time by the lateral distance.

* * * * *